(12) United States Patent
Wang et al.

(10) Patent No.: US 11,382,123 B2
(45) Date of Patent: Jul. 5, 2022

(54) METHOD AND APPARATUS FOR TRANSMITTING DOWNLINK CONTROL INFORMATION

(71) Applicant: China Academy of Telecommunications Technology, Beijing (CN)

(72) Inventors: Lei Wang, Beijing (CN); Fang-Chen Cheng, Beijing (CN); Xuejuan Gao, Beijing (CN); Xueming Pan, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 247 days.

(21) Appl. No.: 16/075,131

(22) PCT Filed: Jan. 20, 2017

(86) PCT No.: PCT/CN2017/071800
§ 371 (c)(1),
(2) Date: Aug. 2, 2018

(87) PCT Pub. No.: WO2017/133479
PCT Pub. Date: Aug. 10, 2017

(65) Prior Publication Data
US 2018/0376496 A1    Dec. 27, 2018

(30) Foreign Application Priority Data

Feb. 2, 2016  (CN) .......................... 201610074559.8
Mar. 4, 2016  (CN) .......................... 201610125584.4

(51) Int. Cl.
*H04W 72/12*    (2009.01)
*H04L 5/00*     (2006.01)
(Continued)

(52) U.S. Cl.
CPC ....... *H04W 72/1289* (2013.01); *H04L 5/0037* (2013.01); *H04L 5/0044* (2013.01);
(Continued)

(58) Field of Classification Search
None
See application file for complete search history.

(56) References Cited

U.S. PATENT DOCUMENTS

2009/0276675 A1* 11/2009 Ojala .................... H04L 1/1819
714/749
2012/0127938 A1* 5/2012 Lv ...................... H04W 72/1205
370/329

(Continued)

FOREIGN PATENT DOCUMENTS

CN    101801093 A    8/2010
CN    101801097 A    8/2010

(Continued)

OTHER PUBLICATIONS

"3 Generation Partnership Project Technical Specification Group Radio Access Network; Evolved Universal Terrestrial Radio Access (E-UTRA); Multiplexing and channel coding (Release 13)", 3GPP Standard; 3GPP TS 36.212, $3^{rd}$ Generation Partnership Project (3GPP), Mobile Competence Centre, 658, Route Des Lucioles; F-06921 Sophia-Antipolis Cedex; France, vol. RAN WGI, No. VI3.0.0, Jan. 5, 2016. pp. 1-121, [retrieved on Jan. 5, 2816].

(Continued)

*Primary Examiner* — Kenny S Lin
(74) *Attorney, Agent, or Firm* — Kilpatrick Townsend & Stockton, LLP

(57) ABSTRACT

A method and apparatus for transmitting downlink control information. In the present invention, transmitted downlink control information at least comprises one or more of the following information fields: a first information field used (Continued)

for indicating the frequency domain resources occupied by the data resources scheduled by the DCI, a second information field used for indicating the time frequency resources occupied by the data resources scheduled by the DCI, and a third information field used for indicating the scheduled N users. As the resource size occupied by the transmission resources in the frequency domain and/or in the time domain is indicated by means of the downlink control information, transmission of downlink control information can be implemented in flexible resource allocation scenarios having variable transmission time intervals.

20 Claims, 12 Drawing Sheets

(51) Int. Cl.
*H04W 72/04* (2009.01)
*H04L 1/18* (2006.01)

(52) U.S. Cl.
CPC ......... *H04L 5/0091* (2013.01); *H04W 72/042* (2013.01); *H04L 1/1812* (2013.01); *H04L 5/0055* (2013.01); *H04W 72/0446* (2013.01); *H04W 72/0453* (2013.01)

(56) References Cited

U.S. PATENT DOCUMENTS

| | | | |
|---|---|---|---|
| 2013/0195041 A1 | 8/2013 | Papasakellariou et al. | |
| 2013/0294389 A1* | 11/2013 | Hong | H04W 72/046 370/329 |
| 2015/0016361 A1 | 1/2015 | Kim et al. | |
| 2015/0195069 A1* | 7/2015 | Yi | H04W 76/27 370/329 |
| 2016/0007374 A1* | 1/2016 | Lee | H04W 72/0446 370/336 |
| 2016/0182209 A1* | 6/2016 | Li | H04L 5/1469 370/329 |
| 2017/0055251 A1* | 2/2017 | Zhang | H04W 72/042 |
| 2018/0205534 A1* | 7/2018 | Yi | H04J 3/02 |
| 2020/0328850 A1* | 10/2020 | Feng | H04L 1/1812 |

FOREIGN PATENT DOCUMENTS

| | | |
|---|---|---|
| CN | 103716823 A | 4/2014 |
| CN | 103874217 A | 6/2014 |
| JP | 2010-516129 A | 5/2010 |
| KR | 20090097215 A | 9/2009 |
| WO | 2013012261 A2 | 1/2013 |

OTHER PUBLICATIONS

"3 Generation Partnership Project; 1-15 Technical Specification Group Radio Access Network; Evolved Universal Terrestrial Radio Access (E-UTRA); Physical layer procedures (Release 13)", 3GPP Standard; 3GPP Ts 36.213, $3^{rd}$ Generation Partnership Project (3GPP), Mobile Competence Centre ; 658, Route Des Lucioles , F-06921 Sophia-Antipolis Cedex; France, vol. RAN WGI, No. VI3.0.0, Jan. 5, 2016, pp. 7-224, [retrieved on Jan. 5, 2016].

Neul Ltd: "Cellular IoT Scheduling", 3GPP Draft; GP-150003 Cellular IOT Scheduling , 3rd Generation Partnership Project (3GPP), Mobile Competence Centre ; 650, Route Des Lucioles ; F-06921 Sophia-Antipolis Cedex ; France, 8 pages, Feb. 2, 2015, retrieved from the Internet: URL:http://www.3gpp.org/ftp/Meetings_3GPP_SYNC/GERAN/Docs/, [retrieved on Feb. 2, 2015].

ZTE: "Control overhead reduction for 1-15 small cell", 3GPP Draft; RI-131051 Control Overhead Reduction for Small Cell, 3rd Generation Partnership Project (3GPP), Mobile Competence Centre , 650, Route Des Lucioles; F-06921 Sophia-Antipolis Cedex; France vol. RAN WGI, No. Chicago, USA; Apr. 15, 2013-Apr. 19, 2013, Apr. 6, 2013 (Apr. 6, 2013), 3 pages, XP050697019, Retrieved from the Internet: URL:http://www.3gpp.org/ftp/tsg_ran/WG1_RL1/TSGR1_72b/Docs/, [retrieved on Apr. 6, 2013].

3GPP TS 36.213 V12.7.0, Release 12, Sep. 2015.

Nokia Networks, "DCI design for NB-IoT", 3GPP TSG-RAN WG1 NB-IoT Adhoc, Budapest, Hungary, Jan. 18-20, 2016, total 3 pages, R1-160017.

* cited by examiner

METHOD AND APPARATUS FOR TRANSMITTING DOWNLINK CONTROL INFORMATION

This application is a National Stage of International Application No. PCT/CN2017/071800, filed Jan. 20, 2017, which claims priorities to Chinese Patent Application No. 201610074559.8, filed Feb. 2, 2016, and Chinese Patent Application No. 201610125584.4, filed on Mar. 4, 2016, all of which are hereby incorporated by reference in their entireties.

FIELD

The present invention relates to the field of communications, and particularly to a method and apparatus for transmitting downlink control information.

BACKGROUND (1) The next generation of mobile communication technologies: the mobile internet is providing its users with augmented reality, virtual reality, ultra high-definition (3D) videos, a mobile cloud, and other more abundant service experiences. The Internet of Things extends a service scope of mobile communication from human to human communication to intelligent human to thing, and thing to thing intercommunication, so that the mobile communication technologies are pervaded into more industries and fields. A vast quantity of devices to be connected and a diversity of services over the Internet of Things pose a new technical challenge to mobile communication.

As there are abundant new service demands emerging constantly, there is a higher demand for the performance of future mobile communication systems, e.g., a higher peak rate, a higher user experienced rate, a shorter delay, higher reliability, higher spectrum efficiency, higher energy consumption efficiency, etc., and a required support of a larger quantity of accessing user equipment, and an access to various types of services. In order to support a vast quantity of various terminals to be connected, and different types of services, flexible configuration of uplink and downlink resources becomes a general trend of technology development. Future system resources can be divided into different sub-bands for different services, and the sub-bands can be allocated with Transmission Time Intervals (TTIs) with different lengths to thereby satisfy various service demands.

(2) Sub-frame structures in an existing Long Term Evolution (LTE) system: FIG. 1 illustrates a frame structure (Frame Structure Type 1 or FS1) in an existing LTE Frequency Division Duplex (FDD) system. In the FDD system, there are different carrier frequencies for uplink and downlink transmission, and there is the same frame structure for both uplink and downlink transmission. Over each carrier, a radio frame with a length of 10 ms includes ten 1 ms sub-frames, and each sub-frame is subdivided into two timeslots with a length of 0.5 ms. A length of time for a TTI in which uplink and downlink data are transmitted is 1 ms.

FIG. 2 illustrates a frame structure (Frame Structure Type 2 or FS2) in an existing LTE TDD system. In the TDD system, there are different sub-frames or timeslots at the same frequency for uplink and downlink transmission. Each 10 ms radio frame in the FS2 includes two 5 ms half-frames, and each half-frame includes five 1 ms sub-frames. The sub-frames in the FS2 are categorized into three categories: downlink sub-frames, uplink sub-frames, and special sub-frames, where each special sub-frame includes three components of a Downlink Pilot Time Slot (DwPTS), a Guard Period (GP), and an Uplink Pilot Time Slot (UpPTS). Here a downlink pilot, downlink service data, and downlink control signaling can be transmitted in the DwPTS; there is no signal transmitted in the GP; and only a random access and a Sounding Reference Symbol (SRS) are transmitted in the UpPTS, but neither uplink service nor uplink control information can be transmitted in the UpPTS. Each half-frame includes at least one downlink sub-frame and at least one uplink sub-frame, and at most one special sub-frame. Table 1 depicts seven uplink-downlink sub-frame configuration patterns supported in the FS2.

TABLE 1

Uplink-downlink configurations

| Uplink-downlink configuration | Downlink-to-Uplink Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(3) Downlink resource granularities in the existing LTE system: in the existing LTE system, the smallest resource granularity in the time domain is an Orthogonal Frequency Division Multiplexing (OFDM) symbol, and the smallest resource granularity in the frequency domain is a sub-carrier. As illustrated in FIG. 3, the index of an elementary Resource Element (RE) is represented as (k,l), where k=0, . . . , $N_{RB}^{CL}N_{sc}^{RB}-1$, and l=0, . . . , $N_{symb}^{DL}-1$, where $N_{RB}^{DL}$ represents the quantity of Physical Resource Blocks (PRBs) in a system bandwidth, $N_{sc}^{RB}$ represents the quantity of sub-carriers in an RB, and $N_{symb}^{DL}$ represents the quantity of OFDM symbols in a downlink timeslot. A PRB is a resource element in a larger dimension, and includes $N_{symb}^{DL} \times N_{sc}^{RB}$ REs. A sub-frame includes a PRB pair, and the PRB pair is an elementary unit at which a data resource is allocated.

(4) DCI formats in the existing LTE system: in the LTE system, Downlink Control Information (DCI) is carried in a Physical Downlink Control Channel (DCI) to transmit uplink/downlink scheduling information and related common control information. A plurality of formats are defined for different information in the DCI, and for example, the DCI formats 0 and 4 are used to schedule uplink data, and the DCI formats 1, 1A, 1B, 1C, 1D, 2, 2A, 2B, and 2C are used to schedule downlink data; and there are different numbers of information bits, and different meanings of information fields, in respective formats of the DCI for different transmission modes or uses thereof. The DCI includes the majority of information required for scheduling a User Equipment (UE), e.g., resource allocation information, a Modulation and Coding Scheme (MCS), a Hybrid Automatic Repeated Request (HARQ) ID, a New Data Indicator (NDI), etc.

In summary, in the existing LTE system, the length of a TTI is fixed at 1 ms, and the smallest granularity at which a resource is allocated is a PRB. The existing DCI can only be used to schedule a resource with the length of 1 ms in a TTI, a resource is scheduled at the smallest granularity of a PRB, and a UE is allocated with consecutive or inconsecutive resources at the smallest granularity of a PRB or a Resource Block Group (RGB) in a TTI.

However a demand for a smaller granularity at which a resource is scheduled, and a more flexible scheme in which a resource is allocated, for future types of services will not be satisfied in the existing DCI formats.

SUMMARY

Embodiments of the invention provide a method and apparatus for transmitting downlink control information so as to enable downlink control information to be transmitted in a scenario where a resource is allocated flexibly in a variable transmission time interval.

An embodiment of the invention provides a method for transmitting Downlink Control Information (DCI), the method including: transmitting the DCI, wherein the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, wherein N is an integer greater than or equal to 1.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user identifiers of the N scheduled users.

In an implementation, the DCI further includes one or any combination of following information fields: a fourth information field indicating a Modulation and Coding Scheme (MCS), or a group of MCSs; a fifth information field indicating a piece of or a group of pieces of multi-input multi-output channel information; a sixth information field indicating a Hybrid Automatic Repeated Request (HARQ) process identifier or a group of HARQ process identifiers; a seventh information field indicating a piece of or a group of pieces of Acknowledgement/Non-acknowledgement (ACK/NACK) information of an uplink Hybrid Automatic Repeated Request (HARQ); or an eighth information field indicating a type of transmission and/or a type of service.

In an implementation, the seventh information field exists in DCI for scheduling uplink transmission.

In an implementation, the DCI further includes a ninth information field, wherein the ninth information field indicates whether a group of scheduled users are equally allocated with a time-frequency resource region indicated by the first information field and the second information field in the DCI, wherein equal allocation refers to equal allocation in a time domain or in a frequency domain.

In an implementation, before the DCI is transmitted, the method further includes: allocating, by a base station, transmission resources for the N scheduled users.

In an implementation, after the DCI is transmitted, the method further includes: transmitting, by a base station, data with the N scheduled users over allocated transmission resources.

Another embodiment of the invention provides a method for transmitting Downlink Control Information (DCI), the method including: receiving the DCI, wherein the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, wherein N is an integer greater than or equal to 1.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user identifiers of the N scheduled users.

In an implementation, the DCI further includes one or any combination of following information fields: a fourth information field indicating a Modulation and Coding Scheme (MCS), or a group of MCSs; a fifth information field indicating a piece of or a group of pieces of multi-input multi-output channel information; a sixth information field indicating a Hybrid Automatic Repeated Request (HARQ) process identifier or a group of HARQ process identifiers; a seventh information field indicating a piece of or a group of pieces of Acknowledgement/Non-acknowledgement (ACK/NACK) information of an uplink Hybrid Automatic Repeated Request (HARQ); or an eighth information field indicating a type of transmission and/or a type of service.

In an implementation, the seventh information field exists in DCI for scheduling uplink transmission.

In an implementation, the DCI further includes a ninth information field, wherein the ninth information field indicates whether a group of scheduled users are equally allocated with a time-frequency resource region indicated by the first information field and the second information field in the DCI, wherein equal allocation refers to equal allocation in a time domain or in a frequency domain.

In an implementation, after the DCI is received, the method further includes: receiving or transmitting data over a transmission resource allocated by a base station.

An embodiment of the invention provides a base station including: a sending module configured to transmit Downlink Control Information (DCI), wherein the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, wherein N is an integer greater than or equal to 1.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user identifiers of the N scheduled users.

In an implementation, the DCI further includes one or any combination of following information fields: a fourth information field indicating a Modulation and Coding Scheme (MCS), or a group of MCSs; a fifth information field indicating a piece of or a group of pieces of multi-input multi-output channel information; a sixth information field indicating a Hybrid Automatic Repeated Request (HARQ) process identifier or a group of HARQ process identifiers; a seventh information field indicating a piece of or a group of pieces of Acknowledgement/Non-acknowledgement (ACK/NACK) information of an uplink Hybrid Automatic Repeated Request (HARQ); or an eighth information field indicating a type of transmission and/or a type of service.

In an implementation, the seventh information field exists in DCI for scheduling uplink transmission.

In an implementation, the DCI further includes a ninth information field, wherein the ninth information field indicates whether a group of scheduled UEs are equally allocated with a time-frequency resource region indicated by the first information field and the second information field in the DCI, wherein equal allocation refers to equal allocation in a time domain or in a frequency domain.

In an implementation, the base station further includes: an allocating module configured to allocate transmission resources for the N scheduled users before the DCI is transmitted.

In an implementation, the base station further includes: a transmitting module configured to transmit data with the N scheduled users over allocated transmission resources after the DCI is transmitted.

An embodiment of the invention provides a User Equipment (UE) including: a receiving module configured to receive Downlink Control Information (DCI), wherein the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, wherein N is an integer greater than or equal to 1.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user identifiers of the N scheduled users.

In an implementation, the DCI further includes one or any combination of following information fields: a fourth information field indicating a Modulation and Coding Scheme (MCS), or a group of MCSs; a fifth information field indicating a piece of or a group of pieces of multi-input multi-output channel information; a sixth information field indicating a Hybrid Automatic Repeated Request (HARQ) process identifier or a group of HARQ process identifiers; a seventh information field indicating a piece of or a group of pieces of Acknowledgement/Non-acknowledgement (ACK/NACK) information of an uplink Hybrid Automatic Repeated Request (HARQ); or an eighth information field indicating a type of transmission and/or a type of service.

In an implementation, the seventh information field exists in DCI for scheduling uplink transmission.

In an implementation, the DCI further includes a ninth information field, wherein the ninth information field indicates whether a group of scheduled UEs are equally allocated with a time-frequency resource region indicated by the first information field and the second information field in the DCI, wherein equal allocation refers to equal allocation in a time domain or in a frequency domain.

In an implementation, the UE further includes: a transmitting module configured to receive or transmit data over a transmission resource allocated by a base station after the DCI is received.

Another embodiment of the invention provides a base station including: a processor, a memory, a transceiver, and a bus interface, wherein: the processor is configured to read and execute programs in the memory to: transmit Downlink Control Information (DCI), wherein the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, where N is an integer greater than or equal to 1.

Another embodiment of the invention provides a User Equipment (UE) including: a processor, a memory, a transceiver, and a bus interface, wherein: the processor is configured to read and execute programs in the memory to: receive Downlink Control Information (DCI), wherein the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, where N is an integer greater than or equal to 1.

In the embodiments above of the invention, transmitted downlink control information includes at least one or more of the following information fields: a first information field indicating a frequency resource occupied by a data resource scheduled by the DCI, a second information field indicating a time resource occupied by the data resource scheduled by the DCI, and a third information field indicating N scheduled users. Since the downlink control information can indicate one or more of the following information: the frequency resource occupied by the data resource scheduled by the DCI, e.g., resource elements or sub-carriers, and the time resource occupied by the data resource scheduled by the DCI, e.g., symbols occupied in the time domain, the downlink control information can be transmitted in a scenario where a resource is allocated flexibly in a variable transmission time interval.

DETAILED DESCRIPTION OF THE EMBODIMENTS

As the mobile technologies are advancing, a future mobile communication system needs to provide a shorter network delay, and to support more abundant types of services, so dynamic configuration of the length of a TTI and resources occupied in the TTI (e.g., several RUs or even several REs, where the RU stands for a Resource Unit, which can include one or more sub-carriers in the frequency domain, and one or more symbols in the time domain) according to a service demand becomes a trend of technology development. The embodiments of the invention propose a solution to transmitting DCI over a flexibly configured resource in a variable TTI in this scenario where a resource is allocated flexibly.

In the embodiments of the invention, the base station can be an Evolutional Node B (eNB or e-NodeB, for short), a macro eNB, a micro eNB (referred to a small eNB), a pico eNB, an Access Point (AP), or a Transmission Point (TP), in an LTE system, a base station in a next generation of wireless communication system, etc., or the base station can be conceptualized as including cells or sectors, although the embodiments of the invention will not be limited thereto.

In the embodiments of the invention, the UE can be a handheld device, an on-vehicle device, a wearable device, a computing device, or another processing device connected with a wireless modem, and various forms of UEs, Mobile Stations (MSs), terminals, terminal equipment, etc., with a wireless communication function although the embodiments of the invention will not be limited thereto.

In the embodiments of the invention, the LTE system can be regarded as corresponding to the $3^{rd}$ Generation Partnership Project (3GPP) Release 8 (Rel-8 or R8), Release 9 (Rel-9 or R9), Release 10 (Rel-10 or R10), and Releases subsequent thereto, and the LTE network can be structured as a macro cellular, a micro cellular, a pico cellular, a femto network, a network including repeaters and forwarding nodes, or various hybrid network structures (including one or more of the macro cellular, the micro cellular, the pico cellular, the femto network, and the repeaters and forwarding nodes), etc., although the embodiments of the invention will not be limited thereto.

The embodiments of the invention will be described below in details with reference to the drawings.

Figure 1:
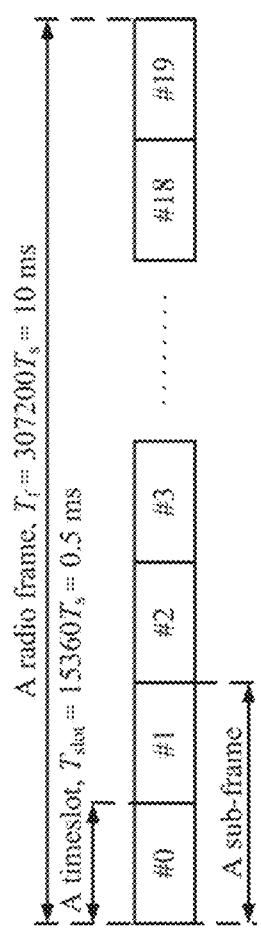
FIG. 1 is a schematic diagram of a frame structure in an LTE FDD system in the prior art.
Figure 2:
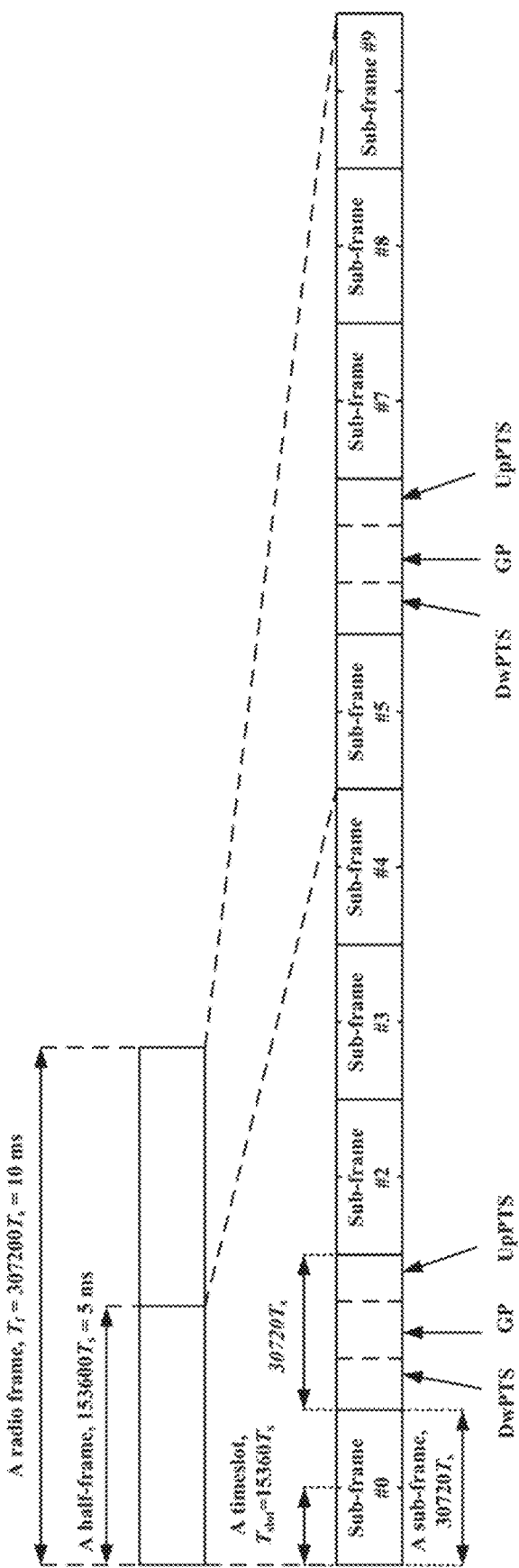
FIG. 2 is a schematic diagram of a frame structure in an LTE TDD system in the prior art.
Figure 3:
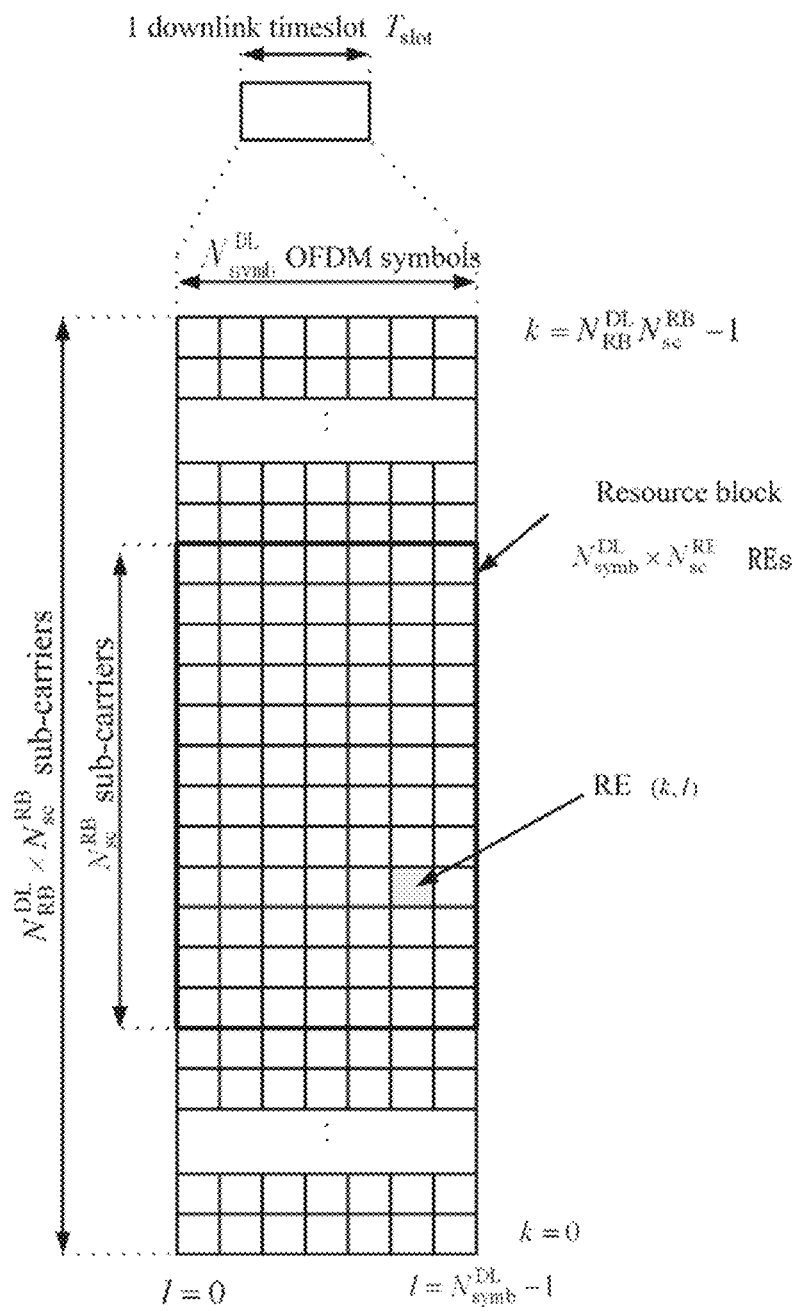
FIG. 3 is a schematic diagram of resources in an LTE system in the prior art.
Figure 4:
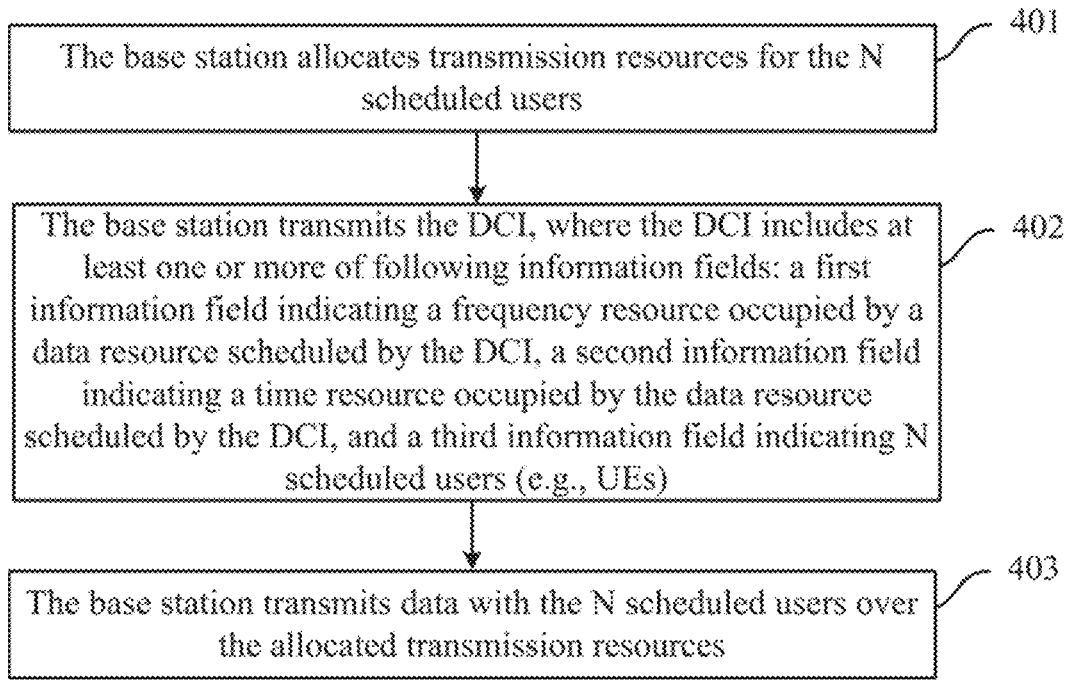
FIG. 4 is a schematic flow chart of transmitting downlink control information at a network side according to an embodiment of the invention.

Referring to FIG. 4 which is a schematic flow chart of transmitting DCI at a network side according to an embodiment of the invention, the flow can be performed by a base station.

As illustrated, the flow can include the following operations.

The operation 402 is to transmit the DCI, where the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users (e.g., UEs, where the same will apply hereinafter), where N is an integer greater than or equal to 1.

Particularly the DCI can include the first information field indicating a size of the frequency resource occupied by the data resource scheduled by the DCI, and for example, the information field can indicate a size of an occupied resource, or a position and a size of an occupied resource, etc.; and the second information field indicating a size of the time resource occupied by the data resource scheduled by the DCI.

Here the first information field can indicate the quantity of RBs occupied by the data resource scheduled by the DCI, or the quantity of resource elements occupied by the data resource scheduled by the DCI, or the quantity of sub-carriers occupied by the data resource scheduled by the DCI.

Here the resource element can be an RU which is a resource region occupying X1 sub-carriers in a frequency domain, and X2 symbols in a time domain, where both X1 and X2 are integers greater than or equal to 1, and their values can be agreed on in advance, or can be configured at a higher layer. The resource element can alternatively be an RE which is a resource region occupying one sub-carrier in the frequency domain, and one symbol in the time domain.

Here the symbol can be an OFDM symbol.

Particularly the second information field can indicate the quantity of symbols occupied by the data resource scheduled by the DCI, or a length of a TTI occupied by the data resource scheduled by the DCI.

Particularly the third information field can indicate an ID of a scheduled UE or IDs of a group of scheduled UEs, where when the UE or UEs are scheduled to transmit in the uplink, the UE or UEs corresponding to the ID or the IDs is or are a UE or UEs to transmit data; and when the UE or UEs are scheduled to transmit in the downlink, the UE or UEs corresponding to the ID or the IDs is or are a UE or UEs to receive data.

Furthermore the DCI can further include one or any combination of the following fourth information field to eighth information field.

A fourth information field indicating an MCS.

In an implementation, the fourth information field includes a piece of or a group of pieces of MCS indication information. For example, if the quantity of scheduled UEs is one (that is, the third information field includes one UE ID), then the fourth information field will include a piece of MCS indication information to instruct the UE corresponding to the UE ID to transmit or receive data according to the MCS. In another example, if the quantity of scheduled UEs is M (M is an integer greater than 1), then the fourth information field may include a piece of MCS indication information to instruct the UEs corresponding to M UE IDs to transmit or receive data according to the MCS. And in still another example, if the quantity of scheduled UEs is M (M is an integer greater than 1), then the fourth information field may include M pieces of MCS indication information, where each piece of MCS indication information instructs a UE corresponding to a UE ID to transmit or receive data according to the MCS.

A fifth information field indicating Multi-Input Multi-Output (MIMO) related information. Where the MIMO related information includes MIMO channel information and particularly the MIMO channel information can include the quantity of Transport Blocks (TBs), a pre-coding matrix index, etc.

In an implementation, the fifth information field includes a piece of or a group of pieces of MIMO related information. For example, if the quantity of scheduled UEs is one (that is, the third information field includes one UE ID), then the fifth information field will include a piece of MIMO channel information to instruct the UE corresponding to the UE ID to transmit or receive data according to the MIMO channel information. In another example, if the quantity of scheduled UEs is M (M is an integer greater than 1), then the fifth information field may include a piece of MIMO channel information to instruct the UEs corresponding to M UE IDs to transmit or receive data according to the MIMO channel information. And in still another example, if the quantity of scheduled UEs is M (M is an integer greater than 1), then the fifth information field may include M pieces of MIMO channel information, where each piece of MIMO channel information instructs a UE corresponding to a UE ID to transmit or receive data according to the MIMO channel information.

A sixth information field indicating an HARQ process identifier (ID). A UE feeds back an HARQ process ID allocated for the UE while making HARQ ACK/NACK feedback, so that the base station identifies the UE transmitting the HARQ ACK/NACK feedback information.

In an implementation, the sixth information field includes a piece of or a group of pieces of HARQ process ID indication information. For example, if the quantity of scheduled UEs is one (that is, the third information field includes one UE ID), then the sixth information field will include a piece of HARQ process ID indication information to instruct the UE corresponding to the UE ID to make HARQ ACK/NACK feedback, and to transmit data, according to the HARQ process ID. In another example, if the quantity of scheduled UEs is M (M is an integer greater than 1), then the sixth information field may include a piece of HARQ process ID indication information to instruct the UEs corresponding to M UE IDs to make HARQ ACK/NACK feedback, and to transmit data, according to the HARQ process ID. And in still another example, if the quantity of scheduled UEs is M (M is an integer greater than 1), then the sixth information field may include M pieces of HARQ process ID indication information, where each piece of HARQ process ID indication information instructs a UE corresponding to a UE ID to make HARQ ACK/NACK feedback, and to transmit data, according to the HARQ process ID.

A seventh information field indicating Acknowledgement/Non-Acknowledgement (ACK/NACK) information of an uplink HARQ.

In an implementation, the seventh information field includes a piece of or a group of pieces of ACK/NACK indication information. For example, if the quantity of scheduled UEs is one (that is, the third information field includes one UE ID), then the seventh information field will include a piece of ACK/NACK information to instruct the UE corresponding to the UE ID to make an UL HARQ according to the ACK/NACK information. In another example, if the quantity of scheduled UEs is M (M is an integer greater than 1), then the seventh information field may include a piece of ACK/NACK information to instruct the UEs corresponding to M UE IDs to make an UL HARQ according to the ACK/NACK information. And in still another example, if the quantity of scheduled UEs is M (M is an integer greater than 1), then the seventh information field may include M pieces of ACK/NACK information, where each piece of ACK/NACK information instructs a UE corresponding to a UE ID to make an UL HARQ according to the ACK/NACK information.

Optionally the seventh information field can exist in DCI for scheduling uplink transmission.

An eighth information field indicating a type of transmission, and/or a type of service. Where the type of transmission can be but will not be limited to unicast, multicast, broadcast; the type of service can be but will not be limited to unicast, paging, a System Information Block (SIB), a Random Access Response (RAR), and a Multimedia Broadcast Multicast Service (MBMS).

Furthermore the DCI above can further include a ninth information field, where the ninth information field indicates whether a group of scheduled UEs are equally allocated with a time-frequency resource region indicated by the first information field and the second information field in the DCI, where equal allocation refers to equal allocation in the time domain or in the frequency domain. Of course, the DCI may alternatively not include the ninth information field above, but it can be determined as agreed on in advance whether to equally allocate for a group of scheduled UEs a time-frequency resource region indicated by the first information field and the second information field in the DCI, or a time-frequency resource region indicated by the first information field and the second information field in the DCI can be allocated for a group of scheduled UEs under a rule agreed on in advance.

In a particular implementation, if there are similar channel conditions of a group of scheduled UEs, and a part of information fields (e.g., an MCS level) may be shared, then a time-frequency resource region indicated by the first information field and the second information field in the DCI may be equally allocated for the group of UE according to an equal allocation flag carried in the ninth information field in the DCI, and an MCS level, and other common information, indicated in the DCI may be shared to thereby lower an overhead. Generally if there are different channel conditions of a group of scheduled UEs, then none of the respective information fields will be shared (e.g., information fields indicating an MCS level, MIMO channel information, etc.), and allocated time-frequency resources may also be different. In this case, the ninth information field may not necessarily exist.

The DCI above can include one or more of the first information field to the third information field, and furthermore can further include one or more of the fourth information field to the ninth information field.

The respective information fields in the DCI above can be arranged in the DCI in an order agreed on in advance, although the embodiments of the invention will not be limited to any particular order in which the respective information fields are arranged.

Here the base station can transmit the DCI in a PDCCH.

Furthermore the method can further include the following operation before the operation 402.

In the operation 401, the base station allocates transmission resources for the N scheduled users.

Here the base station can configure a length of a TTI, and time-frequency resources for transmitting data in the TTI, dynamically according to a service demand, where the time-frequency resources can include several RUs or several REs.

Furthermore the method can further include the following operation after the operation 402.

In the operation 403, the base station transmits data with the N scheduled users over the allocated transmission resources.

Here when the UE or UEs is or are scheduled to transmit in the uplink, the base station receives data transmitted by the UE or the UEs corresponding to the UE ID or the group of UE IDs; and when the UE or UEs is or are scheduled to transmit in the downlink, the base station transmits data to the UE or the UEs corresponding to the UE ID or the group of UE IDs.

As can be apparent from the description above, transmitted DCI includes at least one or more of the following information fields: a first information field indicating a frequency resource occupied by a data resource scheduled by the DCI, a second information field indicating a time resource occupied by the data resource scheduled by the DCI, and a third information field indicating N scheduled users. Since the downlink control information can indicate resource elements or sub-carriers occupied in the frequency domain, and symbols occupied in the time domain, by transmission resources, the downlink control information can be transmitted in a scenario where a resource is allocated flexibly in a variable transmission time interval.

Figure 5:
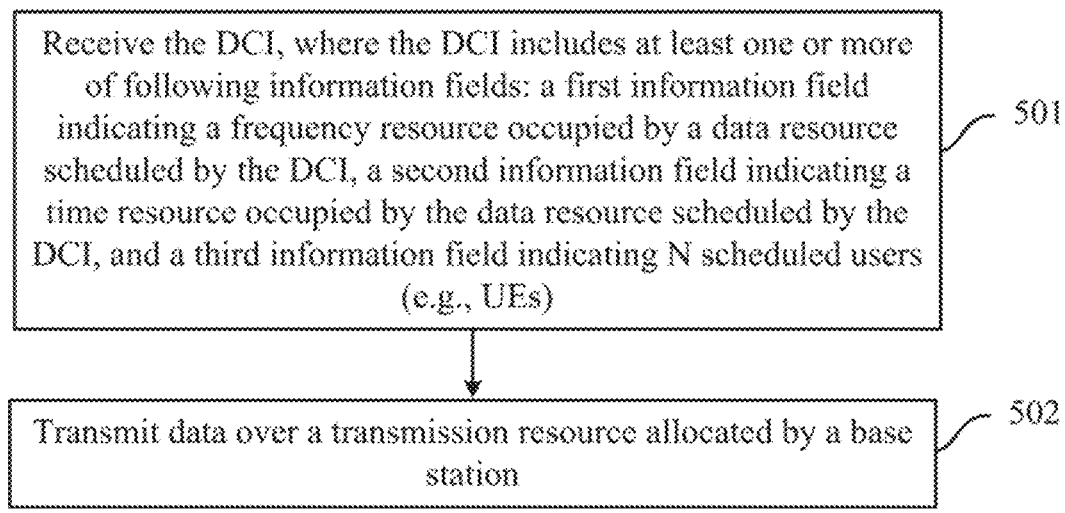
FIG. 5 is a schematic flow chart of transmitting downlink control information at a UE side according to an embodiment of the invention.

Referring to FIG. 5 which is a schematic flow chart of transmitting DCI at a UE side according to an embodiment of the invention, the flow can be performed by a UE.

As illustrated, the flow can include the following operations.

The operation 501 is to receive the DCI, where the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users (e.g., UEs, where the same will apply hereinafter), where N is an integer greater than or equal to 1.

Particularly the DCI can include the first information field indicating a size of the frequency resource occupied by the data resource scheduled by the DCI, and for example, the information field can indicate a size of an occupied resource, or a position and a size of an occupied resource, etc.; and the second information field indicating a size of the time resource occupied by the data resource scheduled by the DCI.

Furthermore the method can further include the following operation after the operation 501.

The operation 502 is to transmit data over a transmission resource allocated by a base station.

Here when the base station schedules the UE to transmit in the downlink, the UE receives data transmitted by the base station over the allocated transmission resource; and when the base station schedules the UE to transmit in the uplink, the UE transmits data to the base station over the allocated transmission resource.

In the flow as illustrated in FIG. 5, reference can be made to the embodiments above for details of the information fields in the DCI, and a related description thereof, so a repeated description thereof will be omitted here.

As can be apparent from the description above, transmitted DCI includes at least one or more of the following information fields: a first information field indicating a frequency resource occupied by a data resource scheduled by the DCI, a second information field indicating a time resource occupied by the data resource scheduled by the DCI, and a third information field indicating N scheduled users. Since the downlink control information can indicate resource elements or sub-carriers occupied in the frequency domain, and symbols occupied in the time domain, by transmission resources, the downlink control information can be transmitted in a scenario where a resource is allocated flexibly in a variable transmission time interval.

In order to make the embodiments above more apparent, they will be described below in connection with several particular application scenarios thereof.

Figure 6A:
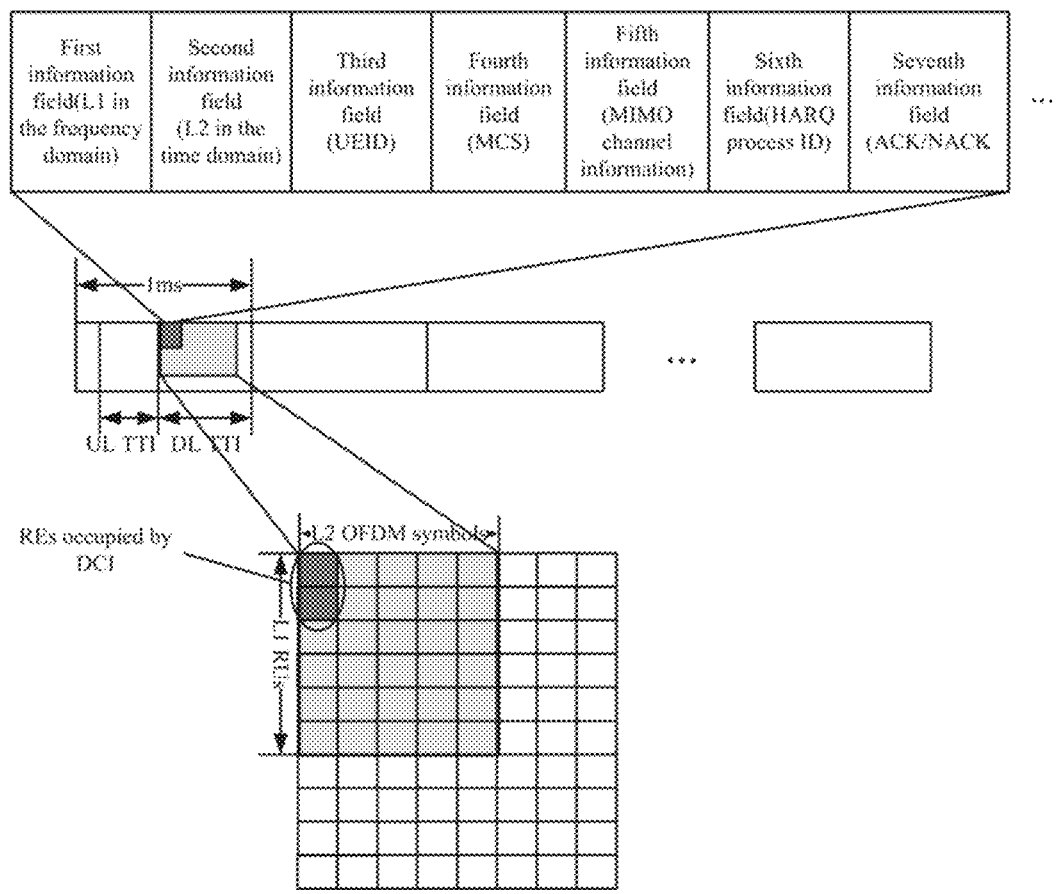
FIG. 6A and FIG. 6B are schematic diagrams respectively of transmitting DCI to schedule a UE according to an embodiment of the invention.

A first scenario: in this scenario, the base station currently schedules only one UE, and allocates for the UE transmission resources occupying L1 RUs in the frequency domain, and L2 OFDM symbols in the time domain. In this scenario, the information fields are composed, and the resources are indicated, in the DCI as illustrated in FIG. 6A.

At the network side, the base station transmits DCI in a PDCCH in a downlink TTI in a sub-frame, where the DCI indicates the scheduled UE, and the transmission resources allocated for the UE in the downlink TTI. Here the DCI includes a first information field indicating L1 RUs, a second information field indicating L2 OFDM symbols, a third information field indicating the ID of the scheduled UE, a fourth information field indicating a modulation and coding level for the UE, a fifth information field indicating channel information of the UE, a sixth information field indicating the current HARQ process ID of the UE, and a seventh information field indicating UL HARQ feedback.

At the UE side, if the UE determines upon reception of the DCI that a UE ID carried in the third information field is the same as the UE ID of the UE, according to the UE ID in the third information field, then the UE will determine that it is scheduled, and determine the time-frequency resource positions occupied by a data region according to indication information carried in the first information field (the quantity of RUs is L1), and indication information carried in the second information field (the quantity of OFDM symbols is L2); and further transmit or receive data in the determined data region according to the MCS indicated in the fourth information field, and the channel information indicated in the fifth information field. Furthermore for downlink data transmission, the UE can further make ACK/NACK feedback according to the HARQ process ID indicated in the sixth information field in the DCI, and make a UL HARQ according to ACK/NACK information indicated in the seventh information field.

In this example, a control channel occupies the RU #0 (i.e., the first RU) in the frequency domain, and the OFDM symbol #0 (i.e., the first OFDM symbol) in the time domain, so the time-frequency positions occupied by the data region include: the RUs with the indexes of 0 to L1-1, i.e., L1 RUs in total, among the RUs occupied in the frequency domain; and the OFDM symbols with the indexes of 0 to L2-1, i.e., L2 OFDM symbols in total, among the OFDM symbols occupied in the time domain. Furthermore when the DCI carries frequency-domain start position and time-domain start position information, the UE can determine the particular positions of the resources over which the data are transmitted, according to the start position information, and resource size information.

Figure 6B:
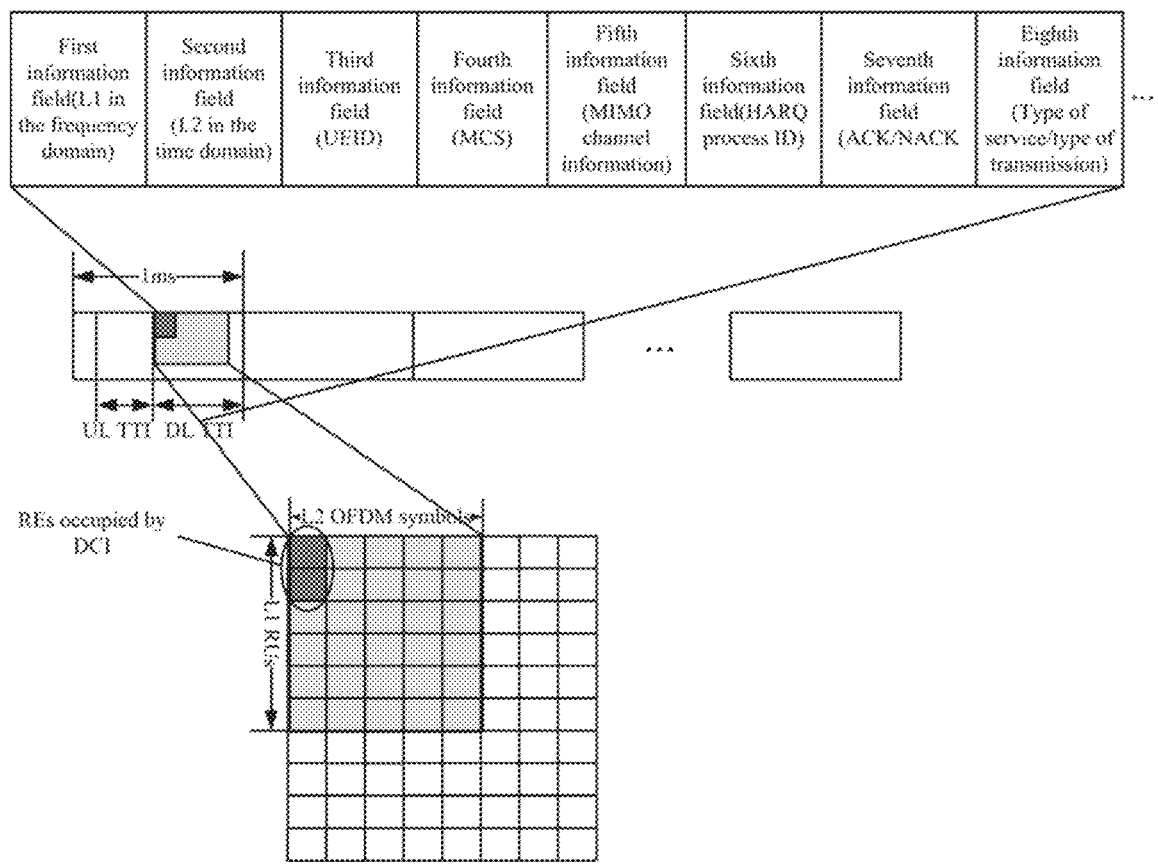

In the first scenario, DCI sent by the base station in another example can be as illustrated in FIG. 6B. The DCI as illustrated in FIG. 6B is different from the DCI as illustrated in FIG. 6A in an additional eighth information field indicating a type of service, and/or a type of transmission, where this information field can indicate the type of service, and/or the type of transmission of the current base station.

The RUs in the example above can be replaced with RBs, that is, the first information field indicates the quantity of RBs occupied by the data resource scheduled by the DCI.

Figure 7A:
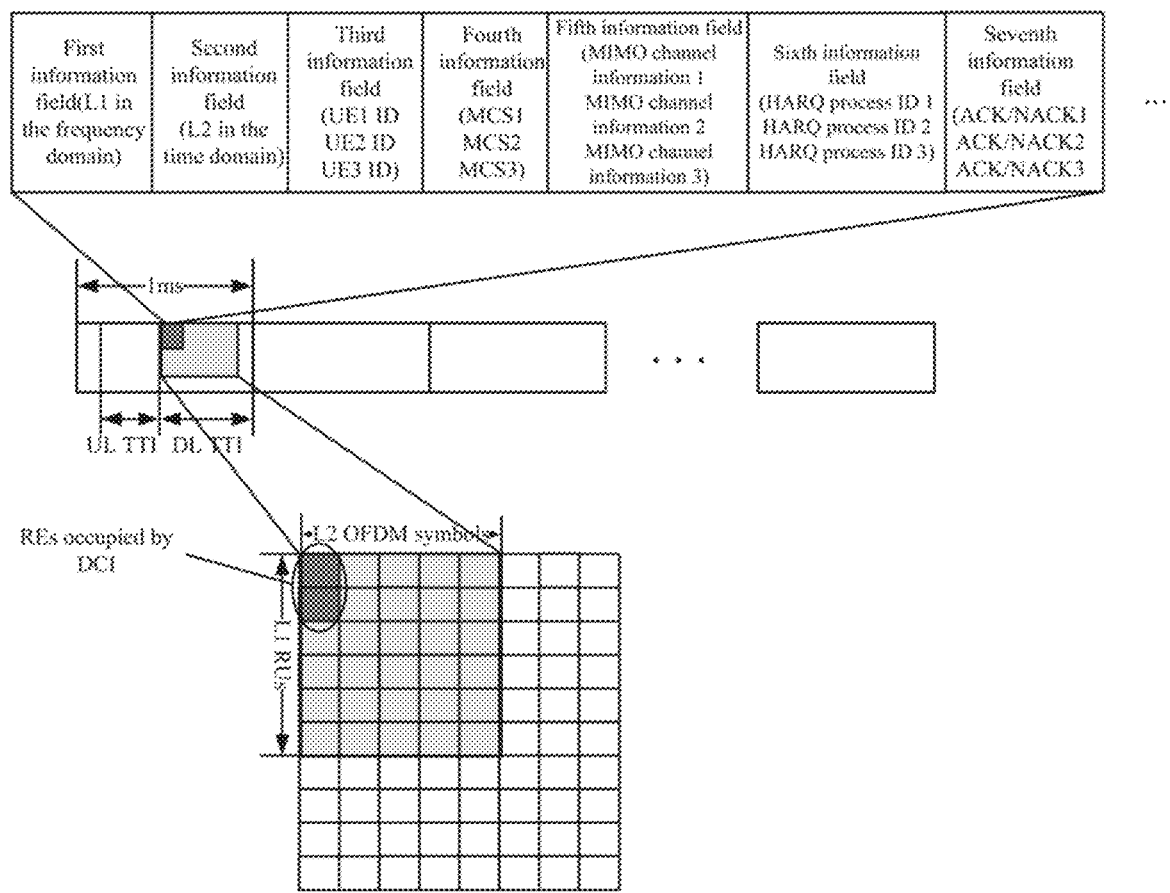
FIG. 7A and FIG. 7B are schematic diagrams respectively of transmitting DCI to schedule a group of UEs according to an embodiment of the invention.

A second scenario: in this scenario, the base station currently schedules a group of UEs (e.g. three UEs, such as a UE1, a UE2, and a UE3 respectively), and allocates for the UEs transmission resources occupying L1 RUs in the frequency domain, and L2 OFDM symbols in the time domain. In this scenario, the information fields are composed, and the resources are indicated, in the DCI as illustrated in FIG. 7A.

At the network side, the base station transmits DCI in a PDCCH in a downlink TTI in a sub-frame, where the DCI indicates the three scheduled UEs, and the transmission resources allocated for these UEs in the downlink TTI. Here the DCI includes a first information field indicating L1 RUs, a second information field indicating L2 OFDM symbols, a third information field indicating the IDs of the scheduled UE1, UE2, and UE3, a fourth information field indicating respective modulation and coding levels for the three UEs, a fifth information field indicating respective channel information of the three UEs, a sixth information field indicating respective HARQ process IDs of the three UEs, and a seventh information field indicating respective UL HARQ feedback information of the three UEs, where the information in the respective information fields corresponds to each other in a sequential mapping order, and for example, the UE1 ID in the third information field corresponds to the first MCS indication information in the fourth information field, to the first channel information in the fifth information field, the first HARQ process ID in the sixth information field, and the first ACK/NACK information in the seventh information field, and so on.

At the UE side, if a UE determines upon reception of the DCI that a UE ID carried in the third information field is the same as the UE ID of the UE, according to the UE IDs in the third information field, then the UE will determine that it is scheduled, and the UE will determine the time-frequency resource positions occupied by a data region according to indication information carried in the first information field (the quantity of RUs is L1), and indication information carried in the second information field (the quantity of OFDM symbols is L2) with reference to an RU including a control channel; and further transmit or receive data in the determined data region according to the MCSs indicated in the fourth information field, and the channel information indicated in the fifth information field. Furthermore for downlink data transmission, the UE can further make ACK/NACK feedback according to the HARQ process IDs indicated in the sixth information field in the DCI, and make a UL HARQ according to ACK/NACK information indicated in the seventh information field.

In this example, the control channel occupies the RU #0 (i.e., the first RU) in the frequency domain, and the OFDM symbol #0 (i.e., the first OFDM symbol) in the time domain, so the time-frequency positions occupied by the data region include: the RUs with the indexes of 0 to L1-1, i.e., L1 RUs in total, among the RUs occupied in the frequency domain; and the OFDM symbols with the indexes of 0 to L2-1, i.e., L2 OFDM symbols in total, among the OFDM symbols occupied in the time domain. And the UE1, UE2 and UE3 are scheduled by the base station to perform MIMO transmission over the time-frequency resources. Furthermore when the DCI carries frequency-domain start position and time-domain start position information, the UEs can determine the particular positions of the resources over which the data are transmitted, according to the start position information, and resource size information.

Figure 7B:
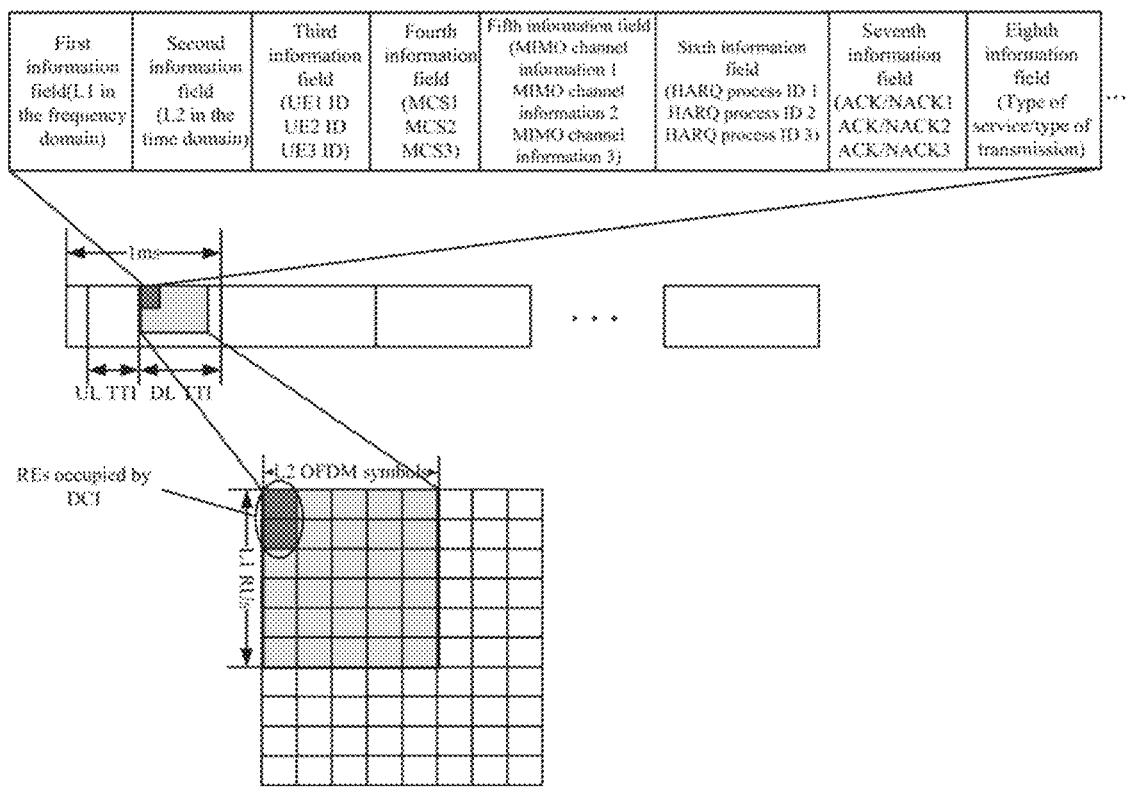

In the second scenario, DCI sent by the base station in another example can be as illustrated in FIG. 7B. The DCI as illustrated in FIG. 7B is different from the DCI as illustrated in FIG. 7A in an additional eighth information field indicating a type of service, and/or a type of transmission, where this information field can indicate the type of service, and/or the type of transmission of the current base station.

The RUs in the example above can be replaced with RBs, that is, the first information field indicates the quantity of RBs occupied by the data resource scheduled by the DCI.

Figure 8A:
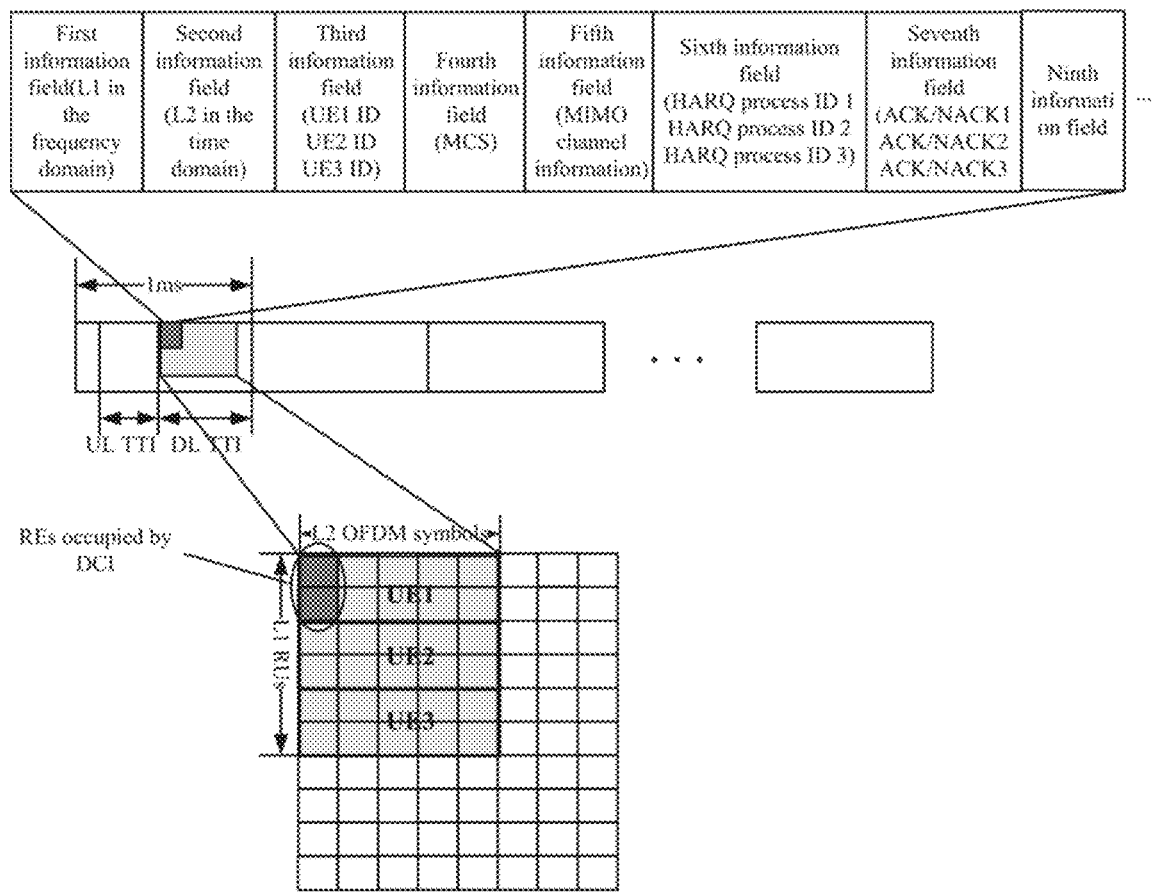
FIG. 8A and FIG. 8B are schematic diagrams respectively of transmitting DCI to schedule a group of UEs according to an embodiment of the invention.

A third scenario: in this scenario, the base station currently schedules a group of UEs (e.g. three UEs, such as a UE1, a UE2, and a UE3 respectively), and there are similar channel conditions, and types of services for this group of UEs. The base station allocates for the UEs transmission resources occupying L1 RUs in the frequency domain, and L2 OFDM symbols in the time domain. In this scenario, the information fields are composed, and the resources are indicated, in the DCI as illustrated in FIG. 8A.

At the network side, the base station transmits DCI in a PDCCH in a downlink TTI in a sub-frame, where the DCI indicates the three scheduled UEs, and the transmission resources allocated for these UEs in the downlink TTI. Here the DCI includes a first information field indicating L1 RUs, a second information field indicating L2 OFDM symbols, a third information field indicating the IDs of the scheduled UE1, UE2, and UE3, a fourth information field indicating a modulation and coding level common to the three UEs, a fifth information field indicating channel information common to the three UEs, a sixth information field indicating respective HARQ process IDs of the three UEs, and a seventh information field indicating respective UL HARQ feedback information of the three UEs, where the information in the respective information fields correspond to each other in a sequential mapping order, and for example, the UE1 ID in the third information field corresponds the first HARQ process ID in the sixth information field, and the first ACK/NACK information in the seventh information field, and so on.

In this case, an additional ninth information field can be added to the DCI to indicate whether a group of UEs need to be equally allocated with a data region indicated in the DCI, where said information field can be a 1-bit information field. For example, when a value of indication information in the ninth information field is 1, these three scheduled UEs are equally allocated with the data region indicated in the DCI, i.e., equally allocated in the time domain or in the frequency domain.

At the UE side, if a UE determines upon reception of the DCI that a UE ID carried in the third information field is the same as the UE ID of the UE, according to the UE IDs in the third information field, then the UE will determine that it is scheduled, and the UE will determine the time-frequency resource positions occupied by the data region according to indication information carried in the first information field (the quantity of RUs is L1), indication information carried in the second information field (the quantity of OFDM symbols is L2), and information indicated in the ninth information field with reference to an RU including a control channel; and further transmit or receive data in the determined data region according to the MCS indicated in the fourth information field, and the channel information indicated in the fifth information field. Furthermore for downlink data transmission, the UE can further make ACK/NACK feedback according to the HARQ process IDs indicated in the sixth information field in the DCI, and make a UL HARQ according to ACK/NACK information indicated in the seventh information field.

In this example, the control channel occupies the RU #0 (i.e., the first RU) in the frequency domain, and the OFDM symbol #0 (i.e., the first OFDM symbol) in the time domain, so the time-frequency positions occupied by the data region include: the RUs with the indexes of 0 to L1-1, i.e., L1 RUs in total, among the RUs occupied in the frequency domain; and the OFDM symbols with the indexes of 0 to L2-1, i.e., L2 OFDM symbols in total, among the OFDM symbols occupied in the time domain. Furthermore when the DCI carries frequency-domain start position and time-domain start position information, the UE can determine the particular positions of the resources over which the data are transmitted, according to the start position information, and resource size information.

Figure 8B:
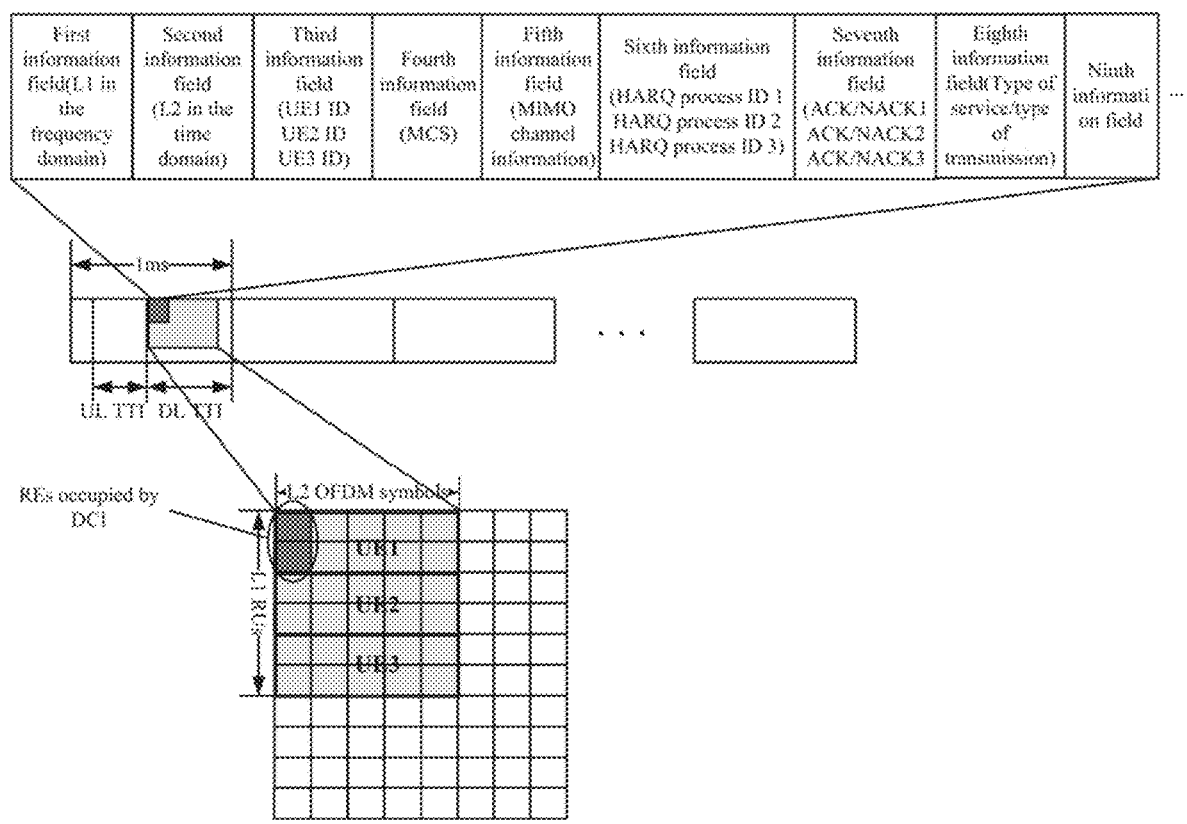

In the third scenario, DCI sent by the base station in another example can be as illustrated in FIG. 8B. The DCI as illustrated in FIG. 8B is different from the DCI as illustrated in FIG. 8A in an additional eighth information field indicating a type of service, and/or a type of transmission, where this information field can indicate the type of service, and/or the type of transmission of the current base station.

The RUs in the example above can be replaced with RBs, that is, the first information field indicates the quantity of RBs occupied by the data resource scheduled by the DCI.

Based upon the same technical concept, an embodiment of the invention further provides a base station, which can perform the function of transmitting DCI at the network side as described in the embodiments above.

Figure 9:
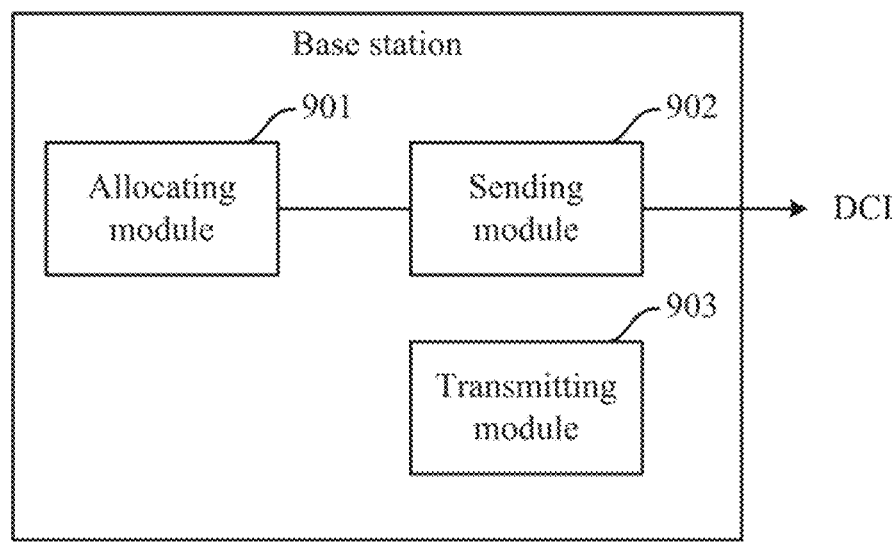
FIG. 9 is a schematic structural diagram of a base station according to an embodiment of the invention.

Referring to FIG. 9 which is a schematic structural diagram of the base station according to the embodiment of the invention, the base station can include a sending module 902; and in a particular implementation, the base station can further include an allocating module 901 and/or a transmitting module 903, where their relationships can be as follows.

The allocating module 901 is configured to allocate transmission resources for N scheduled users.

The sending module 902 is configured to transmit DCI, where the DCI includes at least one or more of following information fields: a first information field indicating a frequency resource occupied by a data resource scheduled by the DCI, a second information field indicating a time resource occupied by the data resource scheduled by the DCI, and a third information field indicating the N scheduled users, where N is an integer greater than or equal to 1.

Particularly the DCI can include the first information field indicating a size of the frequency resource occupied by the data resource scheduled by the DCI, and for example, the information field can indicate a size of an occupied resource, or a position and a size of an occupied resource, etc.; and the second information field indicating a size of the time resource occupied by the data resource scheduled by the DCI.

The transmitting module 903 is configured to transmit data with the N scheduled users over allocated transmission resources.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user IDs of the N scheduled users.

In an implementation, the DCI further includes one or any combination of the following information fields: a fourth information field indicating a Modulation and Coding Scheme (MCS), or a group of MCSs; a fifth information field indicating a piece of or a group of pieces of multi-input multi-output channel information; a sixth information field indicating an HARQ process ID or a group of HARQ process IDs; a seventh information field indicating a piece of or a group of pieces of ACK/NACK information of an HARQ; or an eighth information field indicating a type of transmission and/or a type of service.

In an implementation, the seventh information field can exist in DCI for scheduling uplink transmission.

In an implementation, the downlink control information further includes a ninth information field, wherein the ninth information field indicates whether a group of scheduled users are equally allocated with a time-frequency resource region indicated by the first information field and the second information field in the DCI, where equal allocation refers to equal allocation in the time domain or in the frequency domain.

Based upon the same technical concept, an embodiment of the invention further provides a UE, which can perform the function of transmitting DCI at the UE side as described in the embodiments above.

Figure 10:
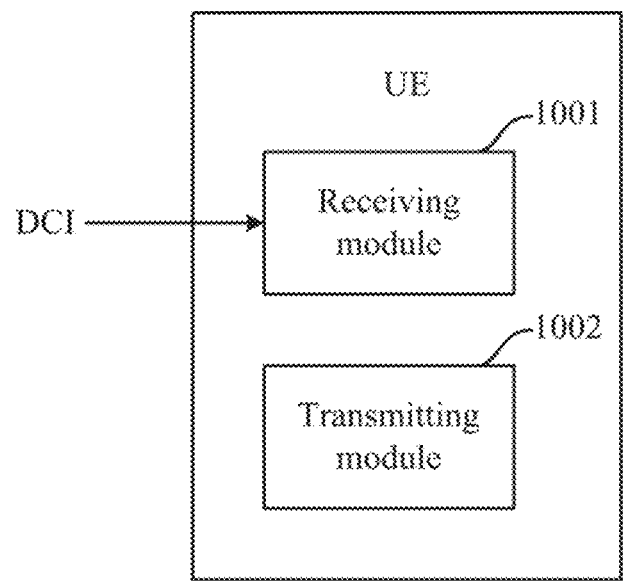
FIG. 10 is a schematic structural diagram of a UE according to an embodiment of the invention.

Referring to FIG. 10 which is a schematic structural diagram of the UE according to the embodiment of the invention, the UE can include a receiving module 1001; and in a particular implementation, the UE can further include a transmitting module 1002, where their relationships can be as follows.

The receiving module 1001 is configured to receive DCI, where the DCI includes at least one or more of following information fields: a first information field indicating a frequency resource occupied by a data resource scheduled by the DCI, a second information field indicating a time resource occupied by the data resource scheduled by the DCI, and a third information field indicating N scheduled users, where N is an integer greater than or equal to 1; and the transmitting module 1002 is configured to receive or transmit data over an allocated transmission resource.

Particularly the DCI can include the first information field indicating a size of the frequency resource occupied by the data resource scheduled by the DCI, and for example, the information field can indicate a size of an occupied resource, a position and a size of an occupied resource, etc.; and the second information field indicating a size of the time resource occupied by the data resource scheduled by the DCI.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user IDs of the N scheduled users.

In an implementation, the DCI further includes one or any combination of the following information fields: a fourth information field indicating a Modulation and Coding Scheme (MCS), or a group of MCSs; a fifth information field indicating a piece of or a group of pieces of multi-input multi-output channel information; a sixth information field indicating an HARQ process ID or a group of HARQ process IDs; a seventh information field indicating a piece of or a group of pieces of ACK/NACK information of an HARQ; or an eighth information field indicating a type of transmission and/or a type of service.

In an implementation, the seventh information field can exist in DCI for scheduling uplink transmission.

In an implementation, the DCI further includes a ninth information field, where the ninth information field indicates whether a group of scheduled users are equally allocated with a time-frequency resource region indicated by the first information field and the second information field in the DCI, where equal allocation refers to equal allocation in the time domain or in the frequency domain.

Based upon the same technical concept, an embodiment of the invention further provides a base station, which can perform the function of transmitting DCI at the network side as described in the embodiments above.

Figure 11:
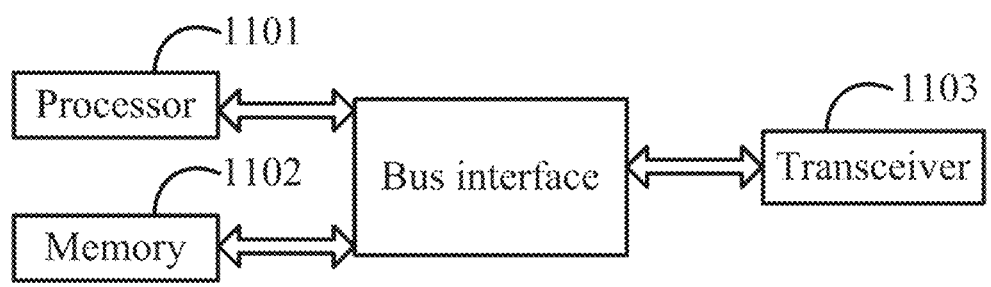
FIG. 11 is a schematic structural diagram of a base station according to another embodiment of the invention.

Referring to FIG. 11 which is a schematic structural diagram of the base station according to the embodiment of the invention, the base station can include a processor 1101, a memory 1102, a transceiver 1103, and a bus interface, where: the processor 1101 is responsible for managing bus architecture and performing normal processes, and the memory 1102 can store data for use by the processor 1101 in performing operations. The transceiver 1103 is configured to receive and transmit data under the control of the processor 1101.

The bus architecture can include any quantity of interconnecting buses and bridges to particularly link together various circuits including one or more processors represented by the processor 1101, and one or more memories represented by the memory 1102. The bus architecture can further link together various other circuits, e.g., a peripheral device, a manostat, a power management circuit, etc., all of which are well known in the art, so a further description thereof will be omitted in this context. The bus interface serves as an interface. The processor 1101 is responsible for managing the bus architecture and performing normal processes, and the memory 1102 can store data for use by the processor 1101 in performing operations.

The flow of processing a signal according to the embodiment of the invention can be applied to the processor 1101, or performed by the processor 1101. In an implementation, the respective operations in the flow of processing a signal can be performed by integrated logic circuits in hardware, or instructions in software, in the processor 1101. The processor 1101 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the invention can be implemented or performed by the processor 1101. The general-purpose processor can be a micro-processor, or can be any conventional processor, etc. The operations in the method according to the embodiment of the invention can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 1102, and the processor 1101 reads the information in the memory 1102, and performs the operations in the flow of processing a signal, in combination with the hardware thereof.

Particularly the processor 1101 is configured to read and execute programs in the memory 1102 to: transmit DCI, where the DCI includes at least one or more of the following information fields: a first information field indicating a frequency resource occupied by a data resource scheduled by the DCI, a second information field indicating a time resource occupied by the data resource scheduled by the DCI, and a third information field indicating N scheduled users, where N is an integer greater than or equal to 1.

Particularly the DCI can include the first information field indicating a size of the frequency resource occupied by the data resource scheduled by the DCI, and for example, the information field can indicate a size of an occupied resource, or a position and a size of an occupied resource, etc.; and the second information field indicating a size of the time resource occupied by the data resource scheduled by the DCI.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user IDs of the N scheduled users.

In an implementation, the DCI further includes one or any combination of the following information fields: a fourth information field indicating a Modulation and Coding Scheme (MCS), or a group of MCSs; a fifth information field indicating a piece of or a group of pieces of multi-input multi-output channel information; a sixth information field indicating an HARQ process ID or a group of HARQ process IDs; a seventh information field indicating a piece of or a group of pieces of ACK/NACK information of an HARQ; or an eighth information field indicating a type of transmission and/or a type of service.

In an implementation, the seventh information field can exist in DCI for scheduling uplink transmission.

In an implementation, the DCI further includes a ninth information field, where the ninth information field indicates whether a group of scheduled users are equally allocated with a time-frequency resource region indicated by the first information field and the second information field in the DCI, where equal allocation refers to equal allocation in the time domain or in the frequency domain.

In an implementation, the processor 1101 can be further configured to allocate transmission resources for the N scheduled users before the DCI is transmitted.

In an implementation, the processor 1101 can be further configured to transmit data with the N scheduled users over allocated transmission resources after the DCI is transmitted.

Based upon the same technical concept, an embodiment of the invention further provides a UE, which can perform the function of transmitting DCI at the UE side as described in the embodiments above.

Figure 12:
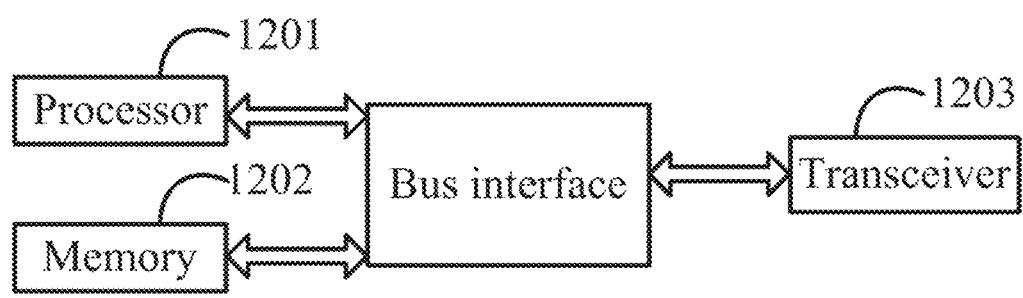
FIG. 12 is a schematic structural diagram of a UE according to another embodiment of the invention.

Referring to FIG. 12 which is a schematic structural diagram of the UE according to the embodiment of the invention, the UE can include a processor 1201, a memory 1202, a transceiver 1203, and a bus interface, where: the processor 1201 is responsible for managing bus architecture and performing normal processes, and the memory 1202 can store data for use by the processor 1201 in performing operations. The transceiver 1203 is configured to receive and transmit data under the control of the processor 1201.

The bus architecture can include any quantity of interconnecting buses and bridges to particularly link together various circuits including one or more processors represented by the processor 1201, and one or more memories represented by the memory 1202. The bus architecture can further link together various other circuits, e.g., a peripheral device, a manostat, a power management circuit, etc., all of which are well known in the art, so a further description thereof will be omitted in this context. The bus interface serves as an interface. The processor 1201 is responsible for managing the bus architecture and performing normal processes, and the memory 1202 can store data for use by the processor 1201 in performing operations.

The flow of processing a signal according to the embodiment of the invention can be applied to the processor 1201, or performed by the processor 1201. In an implementation, the respective operations in the flow of processing a signal can be performed by integrated logic circuits in hardware, or instructions in software, in the processor 1201. The processor 1201 can be a general-purpose processor, a digital signal processor DSP, an application specific integrated circuit, a field programmable gate array, or another programmable logic device, discrete gate, transistor logic device, or discrete hardware component. The respective methods, operations, and logic block diagrams disclosed in the embodiments of the invention can be implemented or performed by the processor 1201. The general-purpose processor can be a micro-processor, or can be any conventional processor, etc. The operations in the method according to the embodiment of the invention can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 1202, and the processor 1201 reads the information in the memory 1202, and performs the operations in the flow of processing a signal, in combination with the hardware thereof.

Particularly the processor 1201 is configured to read and execute programs in the memory 1202 to: receive DCI, where the DCI includes at least one or more of the following information fields: a first information field indicating a frequency resource occupied by a data resource scheduled by the DCI, a second information field indicating a time resource occupied by the data resource scheduled by the DCI, and a third information field indicating N scheduled users, where N is an integer greater than or equal to 1.

Particularly the DCI can include the first information field indicating a size of the frequency resource occupied by the data resource scheduled by the DCI, and for example, the information field can indicate a size of an occupied resource, or a positions and a size of an occupied resource, etc.; and the second information field indicating a size of the time resource occupied by the data resource scheduled by the DCI.

In an implementation, the frequency resource occupied by the data resource scheduled by the DCI includes: the quantity of resource blocks occupied by the data resource scheduled by the DCI; or the quantity of resource blocks occupied by the data resource scheduled by the DCI, and a resource start position of the resource blocks; or the quantity of resource elements occupied by the data resource scheduled by the DCI; or the quantity of resource elements occupied by the data resource scheduled by the DCI, and a start index of the resource elements; or the quantity of sub-carriers occupied by the data resource scheduled by the DCI; or the quantity of sub-carriers occupied by the data resource scheduled by the DCI, and a start index of the sub-carriers.

In an implementation, the time resource occupied by the data resource scheduled by the DCI includes: the quantity of symbols occupied by the data resource scheduled by the DCI; or the quantity of symbols occupied by the data resource scheduled by the DCI, and a start symbol index of the symbols; or a length of a Transmission Time Interval (TTI) for data transmission scheduled by the DCI; or a length of a Transmission Time Interval (TTI) for data transmission scheduled by the DCI, and a time domain start position of the data transmission.

In an implementation, the third information field indicates user IDs of the N scheduled users.

In an implementation, the DCI further includes one or any combination of the following information fields: a fourth information field indicating a Modulation and Coding Scheme (MCS), or a group of MCSs; a fifth information field indicating a piece of or a group of pieces of multi-input multi-output channel information; a sixth information field indicating an HARQ process ID or a group of HARQ process IDs; a seventh information field indicating a piece of or a group of pieces of ACK/NACK information of an HARQ; or an eighth information field indicating a type of transmission and/or a type of service.

In an implementation, the seventh information field can exist in DCI for scheduling uplink transmission.

In an implementation, the DCI further includes a ninth information field, where the ninth information field indicates whether a group of scheduled users are equally allocated with a time-frequency resource region indicated by the first information field and the second information field in the DCI, where equal allocation refers to equal allocation in the time domain or in the frequency domain.

Furthermore the processor 1201 can be further configured to receive or transmit data over an allocated transmission resource after the downlink control information is received.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting Downlink Control Information (DCI), comprising:
    transmitting, by a base station, the DCI to a user equipment (UE), wherein the DCI comprises: a first information field indicating a frequency resource occupied by a data resource scheduled by the DCI, and a second information field indicating a time resource occupied by the data resource scheduled by the DCI;
    wherein the time resource occupied by the data resource scheduled by the DCI comprises:
    a quantity of symbols occupied by the data resource scheduled by the DCI, and a start symbol index of the symbols; or a length of a Transmission Time Interval (TTI) for data transmission scheduled by the DCI and a time domain start position of the data transmission.

2. The method according to claim 1, wherein the DCI further comprises one or any combination of following information fields:
   a fourth information field indicating a Modulation and Coding Scheme (MCS), or a group of MCSs;
   a fifth information field indicating a piece of or a group of pieces of multi-input multi-output channel information;
   a sixth information field indicating a Hybrid Automatic Repeated Request (HARQ) process identifier or a group of HARQ process identifiers;
   a seventh information field indicating a piece of or a group of pieces of Acknowledgement/Non-acknowledgement (ACK/NACK) information of an uplink Hybrid Automatic Repeated Request (HARQ);
   an eighth information field indicating a type of transmission and/or a type of service; or
   a ninth information field indicating whether a group of scheduled users are equally allocated with a time-frequency resource region indicated by the first information field and the second information field in the DCI, wherein equal allocation refers to equal allocation in a time domain or in a frequency domain.

3. The method according to claim 2, wherein the seventh information field exists in DCI for scheduling uplink transmission.

4. The method according to claim 1, wherein before the DCI is transmitted, the method further comprises: allocating, by the base station, transmission resources for the N scheduled users; and/or
   after the DCI is transmitted, the method further comprises: transmitting, by the base station, data with the N scheduled users over allocated transmission resources.

5. The method according to claim 1, wherein the frequency resource occupied by the data resource scheduled by the DCI comprises:
   a quantity of resource blocks occupied by the data resource scheduled by the DCI; or
   a quantity of resource blocks occupied by the data resource scheduled by the DCI, and a resource start position of the resource blocks; or
   a quantity of resource elements occupied by the data resource scheduled by the DCI; or
   a quantity of resource elements occupied by the data resource scheduled by the DCI, and a start index of the resource elements; or
   a quantity of sub-carriers occupied by the data resource scheduled by the DCI; or
   a quantity of sub-carriers occupied by the data resource scheduled by the DCI, and a start index of the sub-carriers.

6. The method according to claim 1, wherein the DCI further comprises: a third information field indicates N scheduled users, wherein N is an integer greater than or equal to 1.

7. The method according to claim 6, wherein the third information field indicates user identifiers of the N scheduled users.

8. A method for transmitting Downlink Control Information (DCI), comprising:
   receiving, by a user equipment (UE), the DCI from a base station, wherein the DCI comprises: a first information field indicating a frequency resource occupied by a data resource scheduled by the DCI, and a second information field indicating a time resource occupied by the data resource scheduled by the DCI;
   transmitting or receiving, by the UE, data over the data resource scheduled by the DCI;
   wherein the time resource occupied by the data resource scheduled by the DCI comprises:
   a quantity of symbols occupied by the data resource scheduled by the DCI, and a start symbol index of the symbols; or
   a length of a Transmission Time Interval (TTI) for data transmission scheduled by the DCI and a time domain start position of the data transmission.

9. The method according to claim 8, wherein the DCI further comprises one or any combination of following information fields:
   a fourth information field indicating a Modulation and Coding Scheme (MCS), or a group of MCSs;
   a fifth information field indicating a piece of or a group of pieces of multi-input multi-output channel information;
   a sixth information field indicating a Hybrid Automatic Repeated Request (HARQ) process identifier or a group of HARQ process identifiers;
   a seventh information field indicating a piece of or a group of pieces of Acknowledgement/Non-acknowledgement (ACK/NACK) information of an uplink Hybrid Automatic Repeated Request (HARQ);
   an eighth information field indicating a type of transmission and/or a type of service; or
   a ninth information field indicating whether a group of scheduled users are equally allocated with a time-frequency resource region indicated by the first information field and the second information field in the DCI, wherein equal allocation refers to equal allocation in a time domain or in a frequency domain.

10. The method according to claim 9, wherein the seventh information field exists in DCI for scheduling uplink transmission.

11. The method according to claim 8, wherein after the DCI is received, the method further comprises: receiving or transmitting, by the UE, data over a transmission resource allocated by the base station.

12. The method according to claim 8, wherein the frequency resource occupied by the data resource scheduled by the DCI comprises:
   a quantity of resource blocks occupied by the data resource scheduled by the DCI; or
   a quantity of resource blocks occupied by the data resource scheduled by the DCI, and a resource start position of the resource blocks; or
   a quantity of resource elements occupied by the data resource scheduled by the DCI; or
   a quantity of resource elements occupied by the data resource scheduled by the DCI, and a start index of the resource elements; or
   a quantity of sub-carriers occupied by the data resource scheduled by the DCI; or
   a quantity of sub-carriers occupied by the data resource scheduled by the DCI, and a start index of the sub-carriers.

13. The method according to claim 8, wherein the DCI further comprises: a third information field indicates N scheduled users, wherein N is an integer greater than or equal to 1.

14. The method according to claim 13, wherein the third information field indicates user identifiers of the N scheduled users.

15. A base station, comprising at least one processor and a memory; wherein the memory is configured to store computer readable program codes, and the at least one processor is configured to execute the computer readable program codes to:
- transmit Downlink Control Information (DCI) to a user equipment (UE), wherein the DCI comprises: a first information field indicating a frequency resource occupied by a data resource scheduled by the DCI, and a second information field indicating a time resource occupied by the data resource scheduled by the DCI;
- wherein the time resource occupied by the data resource scheduled by the DCI comprises:
- a quantity of symbols occupied by the data resource scheduled by the DCI, and a start symbol index of the symbols; or
- a length of a Transmission Time Interval (TTI) for data transmission scheduled by the DCI and a time domain start position of the data transmission.

16. The method according to claim 15, wherein the DCI further comprises one or any combination of following information fields:
- a fourth information field indicating a Modulation and Coding Scheme (MCS), or a group of MCSs;
- a fifth information field indicating a piece of or a group of pieces of multi-input multi-output channel information;
- a sixth information field indicating a Hybrid Automatic Repeated Request (HARQ) process identifier or a group of HARQ process identifier;
- a seventh information field indicating a piece of or a group of pieces of Acknowledgement/Non-acknowledgement (ACK/NACK) information of an uplink Hybrid Automatic Repeated Request (HARQ);
- an eighth information field indicating a type of transmission and/or a type of service; or
- a ninth information field indicating whether a group of scheduled users are equally allocated with a time-frequency resource region indicated by the first information field and the second information field in the DCI, wherein equal allocation refers to equal allocation in a time domain or in a frequency domain;
- wherein the seventh information field exists in DCI for scheduling uplink transmission.

17. The base station according to claim 15, wherein the at least one processor is further configured to execute the computer readable program codes to:
- an allocating module configured to allocate transmission resources for the N scheduled users before the DCI is transmitted; and/or
- transmit data with the N scheduled users over allocated transmission resources after the DCI is transmitted.

18. The base station according to claim 15, wherein the frequency resource occupied by the data resource scheduled by the DCI comprises:
- a quantity of resource blocks occupied by the data resource scheduled by the DCI; or
- a quantity of resource blocks occupied by the data resource scheduled by the DCI, and a resource start position of the resource blocks; or
- a quantity of resource elements occupied by the data resource scheduled by the DCI; or
- a quantity of resource elements occupied by the data resource scheduled by the DCI, and a start index of the resource elements; or
- a quantity of sub-carriers occupied by the data resource scheduled by the DCI; or
- a quantity of sub-carriers occupied by the data resource scheduled by the DCI, and a start index of the sub-carriers.

19. The base station according to claim 15, wherein the DCI further comprises: a third information field indicates N scheduled users, wherein N is an integer greater than or equal to 1.

20. The base station according to claim 19, wherein the third information field indicates user identifiers of the N scheduled users.

* * * * *